(12) United States Patent  
Koike et al.

(10) Patent No.: US 10,521,233 B2  
(45) Date of Patent: Dec. 31, 2019

(54) ELECTRONIC CONTROL UNIT

(71) Applicant: DENSO CORPORATION, Kariya, Aichi-pref. (JP)

(72) Inventors: Katsuhiro Koike, Kariya (JP); Masayuki Kobayashi, Kariya (JP); Masahiko Horiguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 330 days.

(21) Appl. No.: 15/118,783

(22) PCT Filed: Feb. 18, 2015

(86) PCT No.: PCT/JP2015/000747  
§ 371 (c)(1),  
(2) Date: Aug. 12, 2016

(87) PCT Pub. No.: WO2015/136844  
PCT Pub. Date: Sep. 17, 2015

(65) Prior Publication Data  
US 2017/0052787 A1 Feb. 23, 2017

(30) Foreign Application Priority Data  
Mar. 14, 2014 (JP) .................. 2014-051665

(51) Int. Cl.  
*G06F 11/00* (2006.01)  
*G06F 9/32* (2018.01)  
(Continued)

(52) U.S. Cl.  
CPC ............ *G06F 9/321* (2013.01); *G06F 9/3004* (2013.01); *G06F 11/0721* (2013.01);  
(Continued)

(58) Field of Classification Search  
CPC ............ G06F 11/0721; G06F 11/0739; G06F 11/0751; G06F 12/063; G06F 2212/1008; G06F 9/3004; G06F 9/30047; G06F 9/321  
See application file for complete search history.

(56) References Cited

U.S. PATENT DOCUMENTS 4,398,243 A * 8/1983 Holberger ................. G06F 9/26  
711/E12.014  
5,369,647 A * 11/1994 Kreifels ................. G11C 29/02  
365/201  
(Continued)

FOREIGN PATENT DOCUMENTS

JP 2005275841 A 10/2005  
JP 2006150999 A 6/2006

OTHER PUBLICATIONS

Patterson, "Computer Organization and Design 3rd Edition", 2005, Elsevier, 3rd Edition, pp. 282-346 (Year: 2005).*

(Continued)

*Primary Examiner* — Bryce P Bonzo  
*Assistant Examiner* — Jeison C Arcos  
(74) *Attorney, Agent, or Firm* — Harness, Dickey & Pierce, P.L.C.

(57) ABSTRACT

In an electronic control unit, an important process includes several instructions that are successively executed and contain no branch instruction. Each of the instructions is stored in each of storage areas of memory according to an execution sequence. The storage areas are respectively assigned addresses that vary in increments of a specified value according to the execution sequence. The important process stores, in an expected value counter, a value of a program counter when control transitions to the important process. If a comparison result indicates a difference between the value (Continued)

of the program counter and a value of the expected value counter, an occurrence of an error is determined.

7 Claims, 5 Drawing Sheets

(51) Int. Cl.
    *G06F 11/30*     (2006.01)
    *G06F 11/07*     (2006.01)
    *G06F 9/30*     (2018.01)
    *G06F 12/06*     (2006.01)

(52) U.S. Cl.
    CPC ...... *G06F 11/0739* (2013.01); *G06F 11/0751* (2013.01); *G06F 11/30* (2013.01); *G06F 12/063* (2013.01); *G06F 2212/1008* (2013.01)

(56) References Cited

U.S. PATENT DOCUMENTS

| | | | | |
|---|---|---|---|---|
| 5,408,645 A * | 4/1995 | Ikeda | ................ | G06F 11/0757 714/37 |
| 5,544,342 A * | 8/1996 | Dean | ................ | G06F 9/3802 711/119 |
| 5,652,905 A * | 7/1997 | Shinjo | ................ | G06F 15/17 709/234 |
| 5,781,753 A * | 7/1998 | McFarland | ....... | G06F 9/30003 712/209 |
| 6,553,290 B1 * | 4/2003 | Pillar | ................ | G01M 17/00 701/29.4 |
| 7,391,306 B2 * | 6/2008 | Dufournier | ....... | B60C 11/24 152/154.2 |
| 7,461,303 B2 * | 12/2008 | Dart | ................ | G11C 5/147 327/20 |
| 7,600,155 B1 * | 10/2009 | Nickolls | ................ | G06F 11/36 714/38.13 |
| 7,647,458 B1 * | 1/2010 | Click, Jr. | ................ | G06F 12/0269 711/159 |
| 7,711,990 B1 * | 5/2010 | Nickolls | ................ | G06F 11/3648 714/37 |
| 9,606,804 B2 * | 3/2017 | Gschwind | ....... | G06F 9/3806 |
| 2002/0007451 A1 * | 1/2002 | Cho | ................ | G06F 11/3648 712/43 |
| 2002/0032558 A1 * | 3/2002 | Strong | ................ | G06F 9/3005 703/22 |
| 2005/0029869 A1 * | 2/2005 | Teran, Jr. | ................ | F02D 11/107 307/10.1 |
| 2005/0216686 A1 | 9/2005 | Matsuyama | | |
| 2007/0271441 A1 * | 11/2007 | Shaw | ................ | G06F 9/3005 712/41 |
| 2008/0012725 A1 * | 1/2008 | Zoladek | ................ | G07C 5/008 340/870.07 |
| 2008/0209173 A1 * | 8/2008 | Evers | ................ | G06F 9/3804 712/207 |
| 2009/0235052 A1 * | 9/2009 | Kudo | ................ | G06F 9/325 712/205 |
| 2011/0209006 A1 * | 8/2011 | Igarashi | ................ | G06F 11/0721 714/37 |
| 2012/0131309 A1 * | 5/2012 | Johnson | ................ | G06F 9/30 712/41 |
| 2013/0018567 A1 * | 1/2013 | Lim | ................ | F02D 41/021 701/102 |
| 2016/0039420 A1 * | 2/2016 | Tosaka | ................ | B60W 30/1886 701/36 |
| 2016/0077834 A1 * | 3/2016 | de Perthuis | ....... | G06F 9/322 712/201 |

OTHER PUBLICATIONS

Fathy, "Exception and Interrupt Handling in ARM", 2006, Universitat Stuttgart, p. 1-17 (Year: 2006).*

Bovet "Understanding the Linux Kernel" Nov. 2005, O'Reillly, p. 102-108 (Year: 2005).*

Rexford "Exceptions and Processes" 2011, p. 1-35 (Year: 2011).*

* cited by examiner

ELECTRONIC CONTROL UNIT

CROSS REFERENCE TO RELATED APPLICATIONS

This application is a U.S. National Phase Application under 35 U.S.C. 371 of International Application No. PCT/JP2015/000747 filed on Feb. 18, 2015 and published in Japanese as WO 2015/136844 A1 on Sep. 17, 2015. This application is based on and claims the benefit of priority from Japanese Patent Application No. 2014-051665 filed on Mar. 14, 2014. The entire disclosures of all of the above applications are incorporated herein by reference.

TECHNICAL FIELD

The present disclosure relates to an electronic control unit that reads and executes an instruction stored in a memory unit.

BACKGROUND ART

There is conventionally known an electronic control unit that reads and executes an instruction stored in a memory unit to control apparatuses associated with a vehicle body such as lighting apparatuses and power windows (see patent literature 1).

This type of electronic control units may use a dual core lockstep system to reduce unforeseeable risks caused by malfunction of the electronic control unit (i.e., to ensure the functional safety).

The electronic control unit based on the dual core lockstep system is mainly configured as a microcomputer including two arithmetic units. The two arithmetic units each execute the same instruction at the same time. An error is assumed to occur in the electronic control unit if a mismatch is found in operation results from the arithmetic units. The electronic control unit may need to be restarted or notify an error occurrence.

PRIOR ART LITERATURES

Patent Literature

Patent Literature 1: JP 2006-150999 A

SUMMARY OF INVENTION

The electronic control unit (microcomputer) based on the dual core lockstep system uses two arithmetic units and necessitates the two arithmetic units executing the same instruction simultaneously. The electronic control unit (microcomputer) based on the dual core lockstep system needs to always operate the two arithmetic units, increasing the power consumption.

Namely, the related art hampers saving the power consumption while ensuring the functional safety.

It is an object of the present disclosure to allow an electronic control unit to save the power consumption while ensuring the functional safety.

To achieve the above object, according to an example of the present disclosure, an electronic control unit reading and executing an instruction stored in memory is provided to include a program counter, an execution section, a change section, a storage control section, an update section, a comparison section, and an error determination section.

The program counter indicates an address of the memory to store an instruction to be executed next. The execution section reads and executes an instruction stored in a storage area of the memory corresponding to the address indicated by the program counter. The change section changes, each time the execution section executes the instruction, the address of the memory indicated by the program counter to an address of the memory to store an instruction to be executed next.

The storage control section stores, in an expected value counter, an address of the memory that is stored in the program counter at a time when conducting transition to an instruction group that is included in an important process. The instruction group includes a plurality of instructions that are successively executed to implement a specific process and contain no branch instruction. The instructions are stored respectively in storage areas of the memory according to an execution sequence while addresses of the memory corresponding respectively to the storage areas are varied in increments of a specified value according to the execution sequence.

The update section changes the address of the memory stored in the expected value counter in increments of the specified value each time the execution section executes each of the instructions after the transition to the instruction group included in the important process. The comparison section compares the address of the memory indicated by the program counter with the address of the memory stored in the expected value counter.

The error determination section determines an error occurrence when a comparison result from the comparison section indicates a mismatch between the address of the memory indicated by the program counter and the address of the memory stored in the expected value counter. In the electronic control unit according to the above-mentioned configuration, the expected value counter stores an address of memory stored in the program counter when a process (instruction) to be executed by the execution section transitions to an instruction group included in the important process. The address (value) of memory stored in the expected value counter at this time conforms to an address of memory to store an instruction to be first executed in an instruction group included in the important process. The address (value) of memory stored in the expected value counter varies in increments of a specified value each time the execution section executes an instruction. This updates the content (value) of the expected value counter to an address of memory to store an instruction to be executed next in an instruction group included in the important process.

The address of memory indicated by the program counter is changed to an address of memory to store an instruction to be executed next each time an instruction is executed regardless of whether the execution section executes an instruction group included in the important process.

The address (value) indicated by the program counter matches the address (value) of memory stored in the expected value counter at the time of transition to an instruction group included in the important process. The address (value) indicated by the program counter continues to match the address (value) of memory stored in the expected value counter at least during execution of the instruction included in the important process unless the electronic control unit encounters an error such as a hardware failure.

However, at least one of the program counter and the expected value counter may malfunction if the electronic control unit encounters an error such as a hardware failure. In this case, the address (value) indicated by the program counter differs from the address (value) of memory stored in the expected value counter.

The above-mentioned configuration can detect an error at least during execution of an instruction included in the important process. The electronic control unit may be reset or notify an error occurrence when an error is detected. The electronic control unit can thereby reduce unforeseeable risks caused by malfunction and ensure the functional safety.

The electronic control unit ensures the functional safety using the program counter and the expected value counter as the sole dual system. Unlike a related art, the electronic control unit eliminates the need to duplicate an arithmetic circuit itself such as an arithmetic login unit (ALU). Thus, the electronic control unit can save the power consumption more effectively than a related art.

As above, the electronic control unit can save the power consumption while ensuring the functional safety.

The disclosure can be embodied as not only the above-mentioned electronic control unit, but also a processing method in the electronic control unit, a program product to embody the processing method, and a computer-readable non-transition storage medium that stores the program product.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Embodiments of the disclosure will be described with reference to the accompanying drawings.

<Electronic Control Unit>

Figure 1:
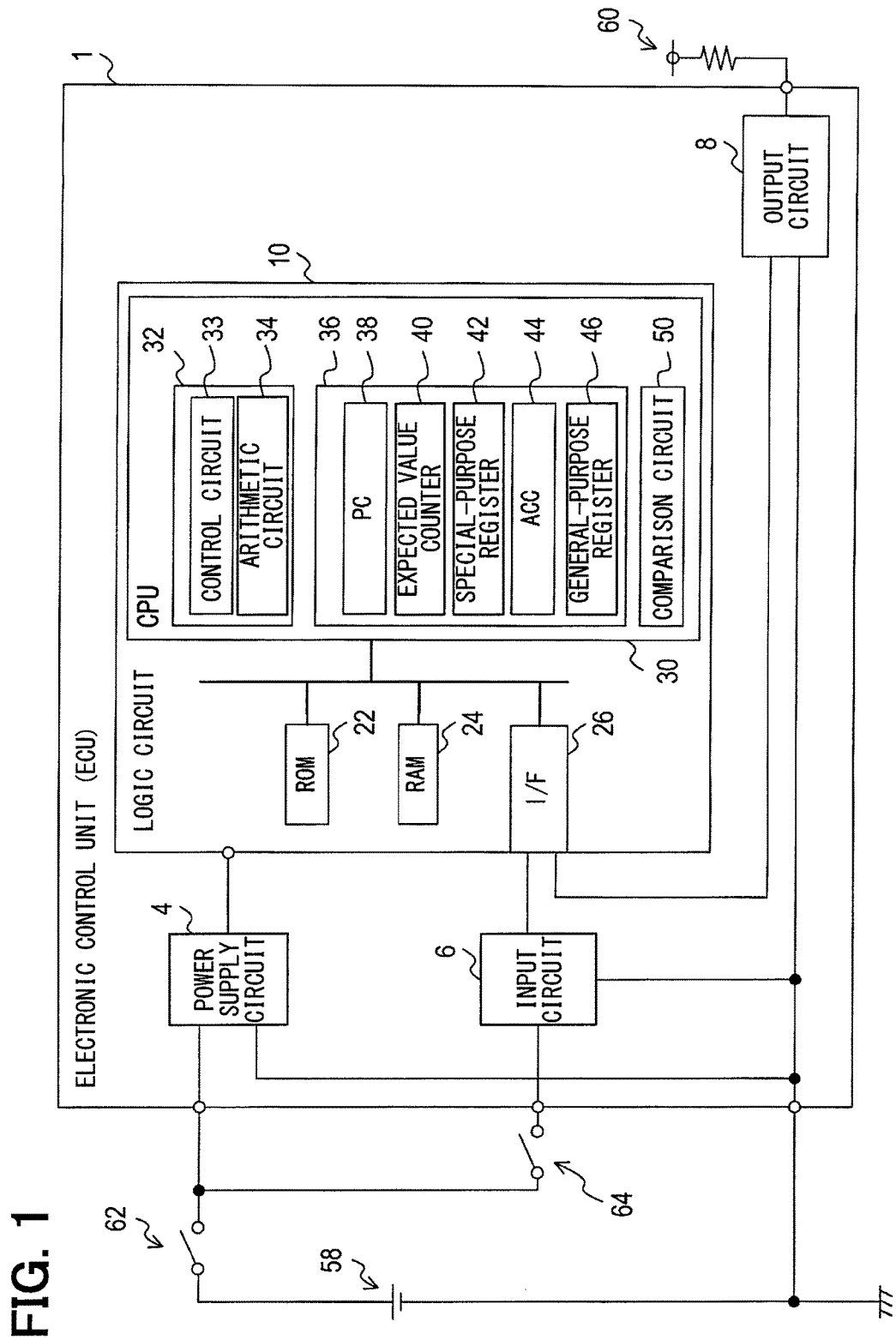
FIG. 1 is a block diagram illustrating a schematic configuration of an electronic control unit according to the disclosure.

An electronic control unit 1 in FIG. 1 controls an onboard apparatus (or a load) 60 mounted on an automobile. The electronic control unit 1 is hereinafter denoted as the ECU 1.

The onboard apparatus 60 controlled by the ECU 1 includes apparatuses mounted on an automobile body such as lighting apparatuses, power windows, and door locks. The onboard apparatus 60 controlled by the ECU 1 is not limited thereto. The onboard apparatus 60 may also include an internal combustion engine, a brake system, a power train mechanism, an automobile navigation system, and various meters.

The ECU 1 includes a power supply circuit 4, an input circuit 6, an output circuit 8, and a logic circuit 10.

When an ignition switch 62 is turned on, the power supply circuit 4 converts the power supplied from an onboard battery 58 into the power needed to operate the circuits 6, 8, and 10 included in the ECU 1 and supplies the power to the circuits 6, 8, and 10. When an SW 64 is turned on, the input circuit 6 accepts an external signal needed to control the onboard apparatus 60 and outputs the accepted signal to the logic circuit 10. The logic circuit 10 supplies a control signal to control the onboard apparatus 60. The output circuit 8 outputs this control signal from the logic circuit 10 to the onboard apparatus 60.

The logic circuit 10 includes ROM 22, RAM 24, an interface (I/F) 26, and a CPU 30.

The ROM 22 stores a processing program or data whose contents need to be stored after the power is turned off. The RAM 24 temporarily stores a processing program or data. The I/F 26 allows the input circuit 6 and the output circuit 8 to perform information communication with other electronic control units or onboard apparatuses.

The CPU 30 is provided as a central processing unit to perform various processes according to a processing program stored in the ROM 22 or the RAM 24. The CPU 30 includes at least an execution unit 32, a register 36, and a comparison circuit 50.

The execution unit 32 includes a control circuit 33 and an arithmetic circuit (ALU) 34. The control circuit 33 is provided as a known controller that provides control to read an instruction from the ROM 22 or the RAM 24 or to write information to the ROM 22 or the RAM 24. The arithmetic circuit 34 is provided as a known arithmetic unit to operate (execute) an instruction read from the ROM 22 or the RAM 24. The control circuit 33 and the arithmetic circuit 34 may not be integrated into the execution unit 32 but may be configured separately. The present application uses "information" as a countable noun as well as an uncountable noun.

The register 36 according to the embodiment includes at least a program counter (PC) 38, an expected value counter 40, a special-purpose register 42, an accumulator (ACC) 44, and a general-purpose register 46.

The program counter 38 is provided as a known register to indicate an address of the memory that stores an instruction to be executed next. The program counter 38 is updated each time the instruction is executed.

The expected value counter 40 is provided as a dedicated register storing an address (value) or its expected value of the memory that stores an instruction to be executed next, in an important process to be described.

The special-purpose register 42 stores a transition destination ID or a return destination ID to be described. The accumulator 44 is provided as a known register to accumulate operation results. The general-purpose register 46 is provided as a known register to implement various functions according to an instruction.

The comparison circuit 50 is provided as a comparator that compares a memory address indicated by the program counter 38 (i.e., a value of the program counter 38) with a value of the expected value counter 40. The comparison circuit 50 outputs an interrupt signal to perform an error handling process if the value of program counter 38 differs from the value of expected value counter 40.

The comparison circuit 50 starts when a process performed by the execution unit 32 transitions to the important process to be described. The comparison circuit 50 stops when the important process transitions to another process. The comparison circuit 50 compares a value of the program counter 38 with a value of the expected value counter 40 before the execution unit 32 executes instructions included in the important process.

<Programs Stored in the Rom>

Figure 2:
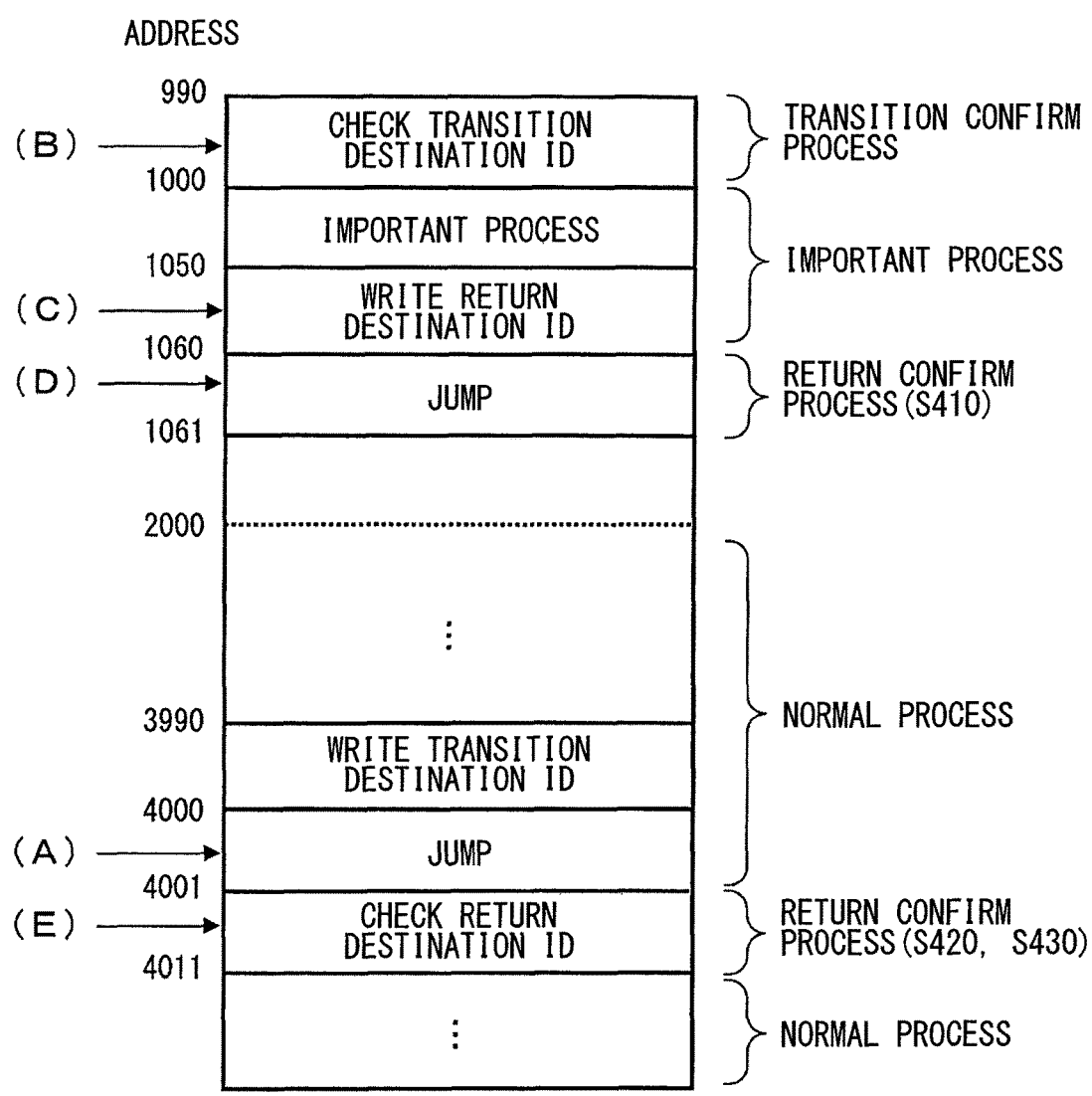
FIG. 2 is an explanatory diagram illustrating an instruction stored in ROM.

As in FIG. 2, the ROM 22 stores processing programs the execution unit 32 of the CPU 30 executes. The processing programs include at least those to perform the normal process, the transition confirmation process, the important process, and the return confirmation process.

The normal process controls the onboard apparatus 60 to be controlled and implements a specified function. The normal process includes several instructions to be performed successively (an example of a normal instruction group). The normal process includes jumps to subroutines and conditional branches as instructions to be executed by the execution unit 32. The normal process according to the embodiment includes a jump (instruction) to the transition confirmation process.

The instructions included in the normal process are stored in a specified storage area of the ROM 22. The instructions included in the normal process are stored in the ROM 22 according to an execution sequence in ascending order of addresses.

The important process includes several instructions successively executed to implement a specific function. The "importance" here also signifies "priority." "Being important" or "high importance" is synonymous with high "priority." The "specific function" affects operation of the normal process (and concerns requirements of the functional safety). For example, the specific function can also write various settings needed to control the onboard apparatus to the register 36 or a rewritable area in the ROM 22. The execution unit 32 may execute one or more important processes.

The important process according to the embodiment includes instructions except a branch instruction. Instructions included in the important process are executed in the order the instructions are stored in the ROM 22. The branch instruction here signifies a conditional branch or a jump, for example.

According to the embodiment, the instructions included in the important process are stored in a storage area corresponding to addresses "1000 through 1050" of the ROM 22 in FIG. 2, for example. This storage area is distant from a specified storage area corresponding to addresses "2000 through 4000" and "4011" or later to store the normal process. The instructions included in the important process are stored in storage areas of the ROM 22 according to an execution sequence in ascending order of addresses; the respective addresses of the storage areas vary in increments of a specified value (e.g., "1") according to the execution sequence.

The embodiment uses a jump to provide transition from the normal process to the important process.

The transition confirmation process is performed while the normal process transitions to the important process. The transition confirmation process determines whether the normal process can normally transition to an instruction group included in the important process. An instruction included in the transition confirmation process is stored in a storage area (e.g., corresponding to addresses "990 through 999" in FIG. 2) preceding the storage area to store the important process of the ROM 22.

The return confirmation process is performed while the important process terminates and then transitions to the normal process. The return confirmation process determines whether the important process can normally transition to the normal process. Instructions included in the return confirmation process are stored in a storage area (e.g., corresponding to address "1060" in FIG. 2) succeeding to the storage area to store the important process and in a storage area (e.g., corresponding to address "4001" in FIG. 2) preceding the storage area to store the normal process after the return.

<Normal Process>

The description below explains the normal process the execution unit 32 of the CPU 30 performs.

The normal process starts when the ignition switch 62 and the switch 64 are turned on, for example. The condition to start the normal process is not limited thereto but may be satisfied otherwise.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

Figure 3:
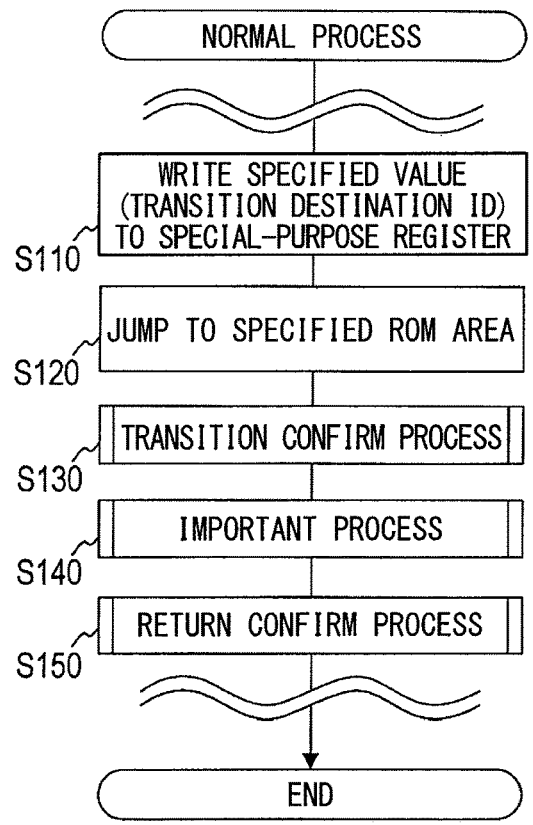
FIG. 3 is a flowchart illustrating a normal process performed by the CPU.

When the normal process starts, the execution unit 32 of the CPU 30 successively reads instructions stored in the ROM 22 as in FIG. 3. When the instruction included in the normal process reaches S110, the execution unit 32 of the CPU 30 writes transition destination ID to the special-purpose register 42 (S110). The transition destination ID provides identification information to identify the important process to which the execution unit 32 of the CPU 30 needs to allow the normal process to transition (jump).

The execution unit 32 of the CPU 30 allows the process to jump to a storage area (e.g., the area to store the transition confirmation process in FIG. 2) preceding the storage area of the ROM 22 to store the important process (S120). The execution unit 32 of the CPU 30 performs the transition confirmation process (S130). The execution unit 32 of the CPU 30 performs the important process if the result of the transition confirmation process enables transition to the important process (S140).

The execution unit 32 of the CPU 30 terminates the important process and then performs the return confirmation process (S150). The execution unit 32 of the CPU 30 successively performs the instructions included in the normal process if the result of the return confirmation process enables normal transition to the normal process.

<Transition Confirmation Process>

The transition confirmation process will be described.

Figure 4:
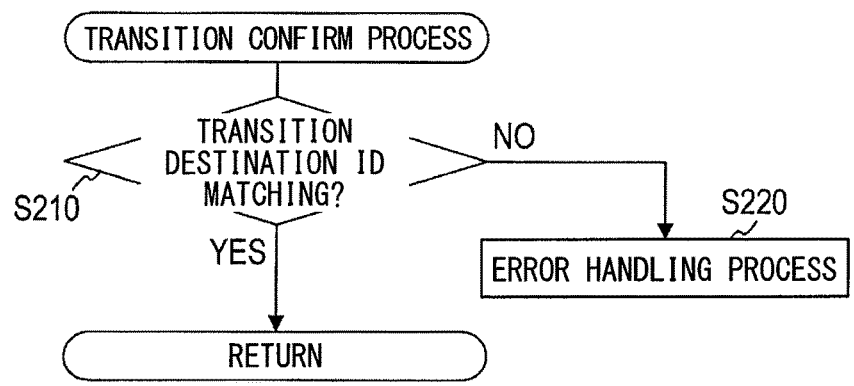
FIG. 4 is a flowchart illustrating a transition confirmation process performed by the CPU.

As in FIG. 4, the transition confirmation process starts at S130 of the normal process. During the transition confirmation process, the execution unit 32 of the CPU 30 compares the transition destination ID written to the special-purpose register 42 at S110 with a transition confirmation ID read from a specified storage area of the ROM 22 (S210). The transition confirmation ID is assigned to each important process and provides identification information unique (specific) to each important process. The transition confirmation ID to be compared at S210 is assigned to the important process targeted at transition.

The result of the comparison at S210 may indicate a difference between the transition destination ID written to the special-purpose register 42 and the transition confirmation ID read from the specified storage area of the ROM 22 (S210: NO). In this case, the execution unit 32 of the CPU 30 performs the error handling process, determining that the CPU 30 itself or the logic circuit 10 causes an error (S220). The error handling process here provides a known process such as resetting (restarting) the ECU 1 or notifying an error occurrence using an indicator or a display apparatus.

The result of the comparison at S210 may indicate a match between the transition destination ID written to the special-purpose register 42 and the transition confirmation ID read from the specified storage area of the ROM 22 (S210: YES). In this case, the execution unit 32 of the CPU 30 deletes the transition destination ID written to the special-purpose register 42. The execution unit 32 of the CPU 30 transitions to the important process, determining that the CPU 30 itself or the logic circuit 10 causes no error.

<Important Process>

The important process will be described.

Figure 5:
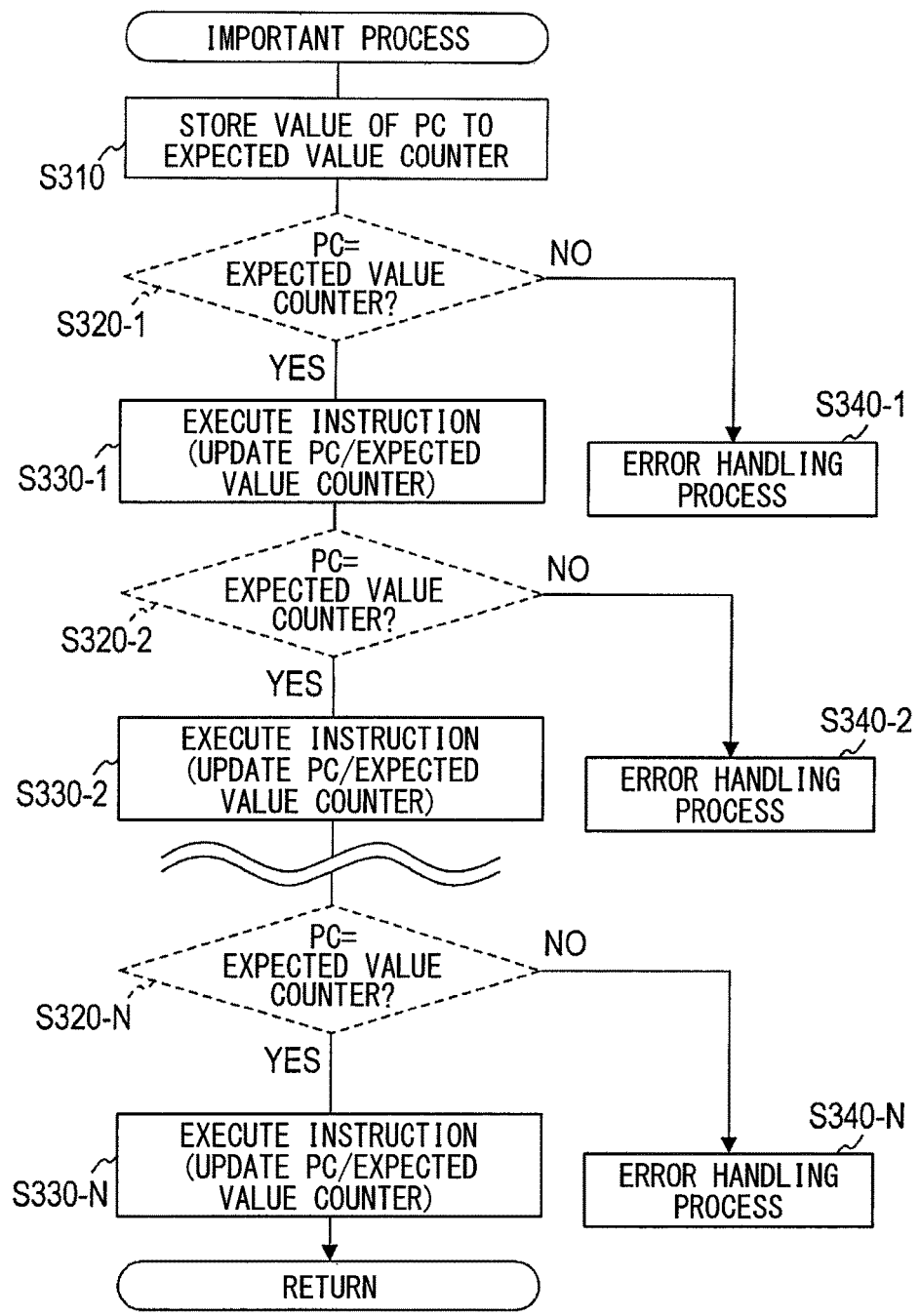
FIG. 5 is a flowchart illustrating an important process performed by the CPU.

During the important process as in FIG. 5, the execution unit 32 of the CPU 30 stores an address of the ROM 22 in the expected value counter 40 (S310). The program counter 38 indicates this address when control passes to the important process.

The comparison circuit 50 of the CPU 30 compares the address of the ROM 22 indicated by the program counter 38 (i.e., the value of the program counter 38) with the value of the expected value counter 40 (S320). A comparison result from the comparison circuit 50 may indicate a difference between both values (S320: NO). In this case, the execution unit 32 of the CPU 30 performs the error handling process (S340). The error handling process here provides a known process such as resetting (restarting) the ECU 1 or notifying an error occurrence using an indicator or a display apparatus. The error handling process at S340 may be implemented as a known interrupt process.

A comparison result from the comparison circuit 50 may indicate a match between the address of the ROM 22 indicated by the program counter 38 (i.e., the value of the program counter 38) and the value of the expected value counter 40 (S320: YES). In this case, the execution unit 32 of the CPU 30 reads an instruction stored in the storage area of the ROM 22 corresponding to the address of the ROM 22 indicated by the program counter 38 and executes the instruction (S330).

At S330, furthermore, the CPU 30 changes the address of the ROM 22 indicated by the program counter 38 to an address of the ROM 22 to store an instruction to be executed next. Namely, the CPU 30 increments the value of the program counter 38 by one at S330.

The CPU 30 increments the address of the ROM 22 stored in the expected value counter 40 by a specified value (i.e., "1") at S330 according to the embodiment. Specifically, the CPU 30 increments the address of the ROM 22 by the specified value (i.e., "1") at S330.

Subsequently, the CPU 30 repeats a sequence from S320 to S330 for the number of instructions (N instructions) included in the important process.

According to the embodiment, the last instruction (S330-N) in the execution sequence of all instructions included in the important process writes the return destination ID to the special-purpose register 42. The return destination ID provides identification information to identify the normal process to which the CPU 30 needs to allow the process to transition (return).

According to the embodiment, the execution unit 32 performs the error handling process if the comparison result from the comparison circuit 50 indicates a difference between the address of the ROM 22 indicated by the program counter 38 (i.e., the value of the program counter 38) and the value of the expected value counter 40. If both values match, the execution unit 32 executes one of the instructions included in the important process. According to the embodiment, the comparison circuit 50 compares the address of the ROM 22 indicated by the program counter 38 (i.e., the value of the program counter 38) with the value of the expected value counter 40.

The flowchart in FIG. 5 illustrating a procedure of the important process performed by the execution unit 32 includes the comparison performed by the comparison circuit 50 between a value of the program counter 38 and a value of the expected value counter 40 in order to understand the entire operation of the logic circuit 10.

<Return Confirmation Process>

The return confirmation process will be described.

Figure 6:
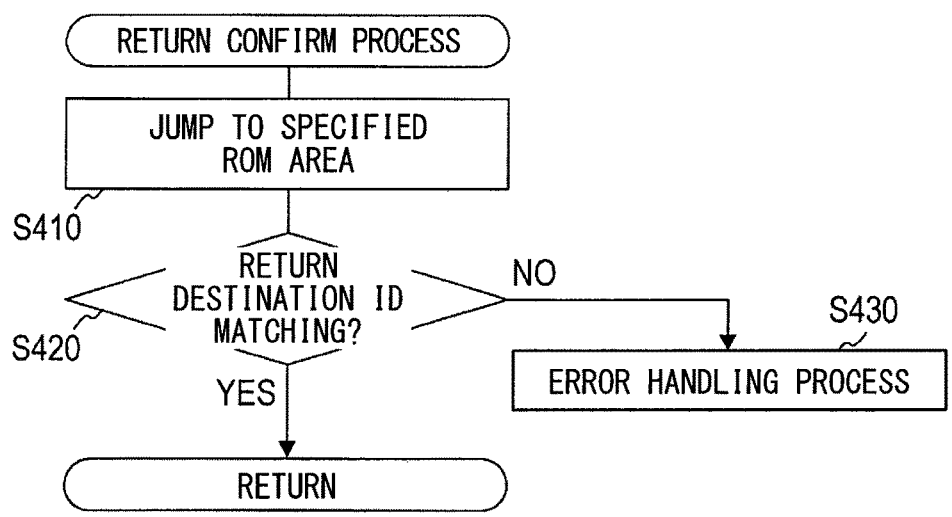
FIG. 6 is a flowchart illustrating a return confirmation process performed by the CPU.

When the return confirmation process starts as in FIG. 6, the execution unit 32 of the CPU 30 allows the process to jump to a storage area (e.g., the area to store an instruction at S420 in FIG. 2) preceding the storage area of the ROM 22 to specify the return destination of the normal process.

The execution unit 32 of the CPU 30 compares the return destination ID with a return confirmation ID read from a specified storage area of the ROM 22 (S420). The return destination ID is written to the special-purpose register 42 during the important process. The return confirmation ID is assigned to each normal process and is unique (specific) to each normal process. The return confirmation ID to be compared at S420 is assigned to the normal process targeted at transition (return).

The comparison result at S420 may indicate a difference between the return destination ID written to the special-purpose register 42 and the return confirmation ID read from the specified storage area of the ROM 22 (S420: NO). In this case, the execution unit 32 of the CPU 30 performs the error handling process, determining that the CPU 30 itself or the logic circuit 10 causes an error (S430). The error handling process here provides a known process such as resetting (restarting) the ECU 1 or notifying an error occurrence using an indicator or a display apparatus.

The result of the comparison at S420 may indicate a match between the return destination ID written to the special-purpose register 42 and the return confirmation ID read from the specified storage area of the ROM 22 (S420: YES). In this case, the execution unit 32 of the CPU 30 deletes the return destination ID written to the special-purpose register 42.

The execution unit 32 of the CPU 30 successively performs the instructions included in the normal process, determining that the CPU 30 itself or the logic circuit 10 causes no error.

At S110 of the normal process, the execution unit 32 of the CPU 30 writes the transition destination ID to the special-purpose register 42. The execution unit 32 of the CPU 30 allows the process to jump to the storage area of the ROM 22 to store the important process ((A) in FIG. 2).

The process jumps to start the transition confirmation process ((B) in FIG. 2). The execution unit 32 of the CPU 30 compares the transition destination ID written to the special-purpose register 42 with the transition confirmation ID read from the specified storage area of the ROM 22. The comparison result may indicate a difference between the transition destination ID written to the special-purpose register 42 and the transition confirmation ID read from the specified storage area of the ROM 22. In this case, the execution unit 32 of the CPU 30 performs the error handling process.

The comparison result may indicate a match between the transition destination ID written to the special-purpose register 42 and the transition confirmation ID read from the specified storage area of the ROM 22. In this case, the execution unit 32 of the CPU 30 deletes the transition destination ID written to the special-purpose register 42. The execution unit 32 of the CPU 30 allows the process to transition to the important process.

During the important process, the execution unit 32 of the CPU 30 stores the address of the ROM 22 indicated by the program counter 38 also in the expected value counter 40 at the time point of transition to the important process. The comparison circuit 50 of the CPU 30 then compares the address of the ROM 22 indicated by the program counter 38 with the value of the expected value counter 40. The comparison result may indicate a difference between both values. In this case, the execution unit 32 of the CPU 30 performs the error handling process.

A comparison result from the comparison circuit 50 may indicate a match between the address of the ROM 22 indicated by the program counter 38 and the value of the expected value counter 40. In this case, the execution unit 32 of the CPU 30 reads an instruction stored in the storage area of ROM 22 corresponding to the address of the ROM 22 indicated by the program counter 38 and executes the instruction. The important process changes the address of ROM 22 indicated by the program counter 38 to an address of the ROM 22 to store an instruction to be executed next. Namely, the important process increments the program counter 38 by one. The important process changes (increases) a value of the expected value counter 40 by a specified value (i.e., "1").

The important process increments the address of the ROM 22 indicated by the program counter 38 (i.e., the value of the program counter 38) and the value of the expected value counter 40 by one each time an instruction is executed.

A comparison result may indicate a match between the address of the ROM 22 indicated by the program counter 38 (i.e., the value of program counter 38) and the value of the expected value counter 40. In this case, the execution unit 32 of the CPU 30 reads an instruction stored in the storage area of ROM 22 corresponding to the address of the ROM 22 indicated by the program counter 38 and executes the instruction.

The execution unit 32 of the CPU 30 allows the process to transition to the return confirmation process when an instruction included in the important process is performed to write the recovery destination ID to the special-purpose register 42 ((C) in FIG. 2). During the return confirmation process, the execution unit 32 of the CPU 30 returns (jumps) to the normal process ((D) in FIG. 2). The execution unit 32 of the CPU 30 compares the return destination ID written to the special-purpose register 42 during the important process with the return confirmation ID read from the specified storage area of the ROM 22 ((E) in FIG. 2).

The comparison result may indicate a difference between the transition destination ID written to the special-purpose register 42 and the return confirmation ID read from the specified storage area of the ROM 22. In this case, the execution unit 32 of the CPU 30 performs the error handling process. The comparison result may indicate a match between the return destination ID written to the special-purpose register 42 and the return confirmation ID read from the specified storage area of the ROM 22. In this case, the execution unit 32 of the CPU 30 deletes the return destination ID written to the special-purpose register 42. The execution unit 32 of the CPU 30 successively performs the instructions included in the normal process.

Effects of the Embodiment

As above, the expected value counter 40 stores an address of the ROM 22 stored in the program counter 38 at the time point when a process (instruction) to be executed by the execution unit 32 of the CPU 30 transitions to the important process. At this time point, the address of the ROM 22 stored in the expected value counter 40 equals the address of the ROM 22 to store an instruction to be executed first in the important process.

The address of the ROM 22 stored in the expected value counter 40 (i.e., the value of the expected value counter 40) is increased by the specified value (i.e., "1") each time the execution unit 32 of the CPU 30 executes an instruction. Increasing the address by the specified value updates the content of the expected value counter 40 to the address of the ROM 22 to store an instruction to be executed next in the important process.

The address of the ROM 22 indicated by the program counter 38 is changed (incremented by one) to the address of the ROM 22 to store an instruction to be executed next each time an instruction is read regardless of whether an instruction executed by the execution unit 32 of the CPU 30 is included in the important process.

If no error such as a hardware failure occurs, the address of the ROM 22 indicated by the program counter 38 (i.e., the value of the program counter 38) equals the value of the expected value counter 40 at the time of transition to the important process. Further, the address of the ROM 22 indicated by the program counter 38 (i.e., the value of the program counter 38) remains equal to the value of the expected value counter 40 during the important process if the logic circuit 10 is not subject to an error such as a hardware failure.

However, at least one of the program counter 38 and the expected value counter 40 may malfunction if the logic circuit 10 encounters a hardware error. In this case, the address of the ROM 22 indicated by the program counter 38 (i.e., the value of the program counter 38) differs from the value of the expected value counter 40.

The CPU 30 can detect an error such as a hardware failure at least during execution of the important process. When an error is detected, the CPU 30 can perform the error handling process to reduce unforeseeable risks caused by malfunction and ensure the functional safety.

In particular, the CPU 30 reads an instruction included in the important process from the ROM 22 and executes the instruction when the address of the ROM 22 indicated by the program counter 38 (i.e., the value of the program counter 38) matches the value of the expected value counter 40. The CPU 30 can execute instructions included in the important process when the logic circuit 10 is normal.

The CPU 30 can ensure that instructions included in the important process are executed in conformity with a predetermined execution sequence. Thus, the CPU 30 can more reliably reduce unforeseeable risks caused by malfunction.

The CPU 30 ensures the functional safety using the program counter 38 and the expected value counter 40 as the sole dual system. Unlike a related art, the CPU 30 need not use two execution units. The CPU 30 can save the power consumption more effectively than a related art.

As above, the CPU 30 can ensure the functional safety and save the power consumption.

The CPU 30 performs the transition confirmation process at the time of transition from the normal process to the important process. The transition confirmation process can determine whether the normal process can normally transition to the important process.

The CPU 30 performs the return confirmation process at the time of transition from the important process to the normal process. The return confirmation process can determine whether the important process can normally transition to the normal process.

The error handling process is performed on the logic circuit 10 when an error is detected in the transition confirmation process or the return confirmation process. This can reduce unforeseeable risks caused by a possible hardware failure that may occur during the transition to the important process or the return to the normal process.

The comparison circuit 50 of the CPU 30 is active while the execution unit 32 performs the important process. This can prevent comparison between a value of the program counter 38 and a value of the expected value counter 40 and prevent an unnecessary error handling process from being performed when the execution unit 32 performs a process other than the important process.

Other Embodiments

While there has been described the embodiment of the present disclosure, the disclosure is not limited to the above-mentioned embodiment but is applicable to various modes within the spirit and scope of the disclosure.

According to the embodiment, for example, the execution unit 32 of the CPU 30 performs processes based on the architecture that jumps to the important process in the middle of the normal process and jumps to the normal process after termination of the important process to return to the normal process. The disclosure is not limited to this architecture of processes the execution unit 32 of the CPU 30 performs.

According to the disclosure, the execution unit 32 of the CPU 30 may perform processes based on an architecture that jumps to the important process in the middle of the normal process and restarts the normal process after termination of the important process without performing the return confirmation process. In this case, an instruction for the normal process after termination of the important process needs to be stored in an area (e.g., address "1050" and later in FIG. 2) immediately succeeding to the area of the ROM 22 to store instructions included in the important process. Further, the important process needs to omit the last instruction that writes the return destination ID to the special-purpose register 42.

According to the disclosure, the execution unit 32 of the CPU 30 may perform only the important process. This omits the normal process, the transition confirmation process, and the return confirmation process the execution unit 32 of the CPU 30 performs. Further, the important process omits the last instruction that writes the return destination ID to the special-purpose register 42.

According to the disclosure, the execution unit 32 of the CPU 30 may perform processes based on an architecture that includes only the important process. While executing one important process, the execution unit 32 may jump to another important process and return to the original important process after termination of the other important process. This architecture may omit the return confirmation process the execution unit 32 of the CPU 30 performs. However, the architecture needs to use a general-purpose register or a stack to save an address of the ROM 22 to be stored in the expected value counter 40 each time the execution unit 32 jumps to different important processes. After returning to the original important process, the execution unit 32 needs to move the address of the ROM 22 saved to the general-purpose register or the stack back to the expected value counter 40.

The execution unit 32 of the CPU 30 may perform processes based on an architecture that uses a mixture of several normal processes and important processes. A jump may perform transition between a normal process and an important process. In this case, the transition confirmation process may be performed each time the normal process transitions to the important process. The return confirmation process may be performed each time the important process transitions to the normal process.

According to the embodiment, the instruction included in the important process writes the return destination ID to the special-purpose register 42. The return confirmation process instead of the important process may write the return destination ID to the special-purpose register 42. A separate process may be performed between the important process and the return confirmation process to do the same. The separate process may include S410 of the return confirmation process.

In the CPU 30 according to the embodiment, the comparison circuit 50 compares an address of the ROM 22 indicated by the program counter 38 with an address of the ROM 22 stored in the expected value counter 40. The execution unit 32 may compare addresses by executing a processing program.

The switch 64 is connected to the input circuit 6 of the ECU 1 according to the embodiment. The switch 64 may be omitted. FIG. 1 illustrates an example of the external structure connected to the input circuit 6 and the output circuit 8 of the ECU 1. Any external structure may be connected to the electronic control unit (ECU) according to the disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An electronic control unit comprising:
a program counter that indicates an address in a memory that stores an instruction to be executed;
an execution section that reads and executes the instruction stored in a storage area of the memory corresponding to the address indicated by the program counter;
a change section that changes, each time the execution section executes the instruction, the address of the memory indicated by the program counter to an address of the memory that stores an instruction to be executed next;
a storage control section that stores, in an expected value counter, an address of the memory that is indicated by the program counter when transitioning from a second process to a first process,
the second process including a second instruction group having a plurality of second instructions to be performed successively while including at least (i) a jump to a subroutine or (ii) a conditional branch, the first process including a first instruction group having a plurality of first instructions that are successively executed and contain no branch instruction, the first instructions being stored respectively in storage areas of the memory according to an execution sequence while addresses of the memory corresponding respectively to the storage areas are varied in increments of a specified value according to the execution sequence;

an update section that changes the address of the memory stored in the expected value counter in increments of the specified value each time the execution section executes each of the first instructions after the transition to the first instruction group included in the first process;

a comparison section that compares the address of the memory indicated by the program counter with the address of the memory stored in the expected value counter; and an error determination section that determines an error occurrence when a comparison result from the comparison section indicates a mismatch between the address of the memory indicated by the program counter and the address of the memory stored in the expected value counter.

2. The electronic control unit according to claim 1, further comprising:

a first write section that writes a transition destination ID to a register before the transition to the first instruction group included in the first process, the transition destination ID being provided as identification information uniquely assigned to the first instruction group included in the first process; and a transition confirmation section that determines whether a match or a mismatch takes place between (i) the transition destination ID written to the register by the first write section, and (ii) a transition confirmation ID assigned as identification information uniquely to the first instruction group included in the first process to provide a determination result, the transition confirmation ID being read from a specified storage area of the memory, identifies an error occurrence if the determination result indicates the mismatch, and permits the transition to the first instruction group included in the first process if the determination result indicates the match.

3. The electronic control unit according to claim 1, further comprising:

a second write section that writes a return destination ID to a register before conducting transition to the second instruction group included in the second process when the first instruction group included in the first process terminates, the return destination ID being provided as identification information about the second instruction group included in the second process; and a return confirmation section that determines whether a match or a mismatch takes place between (i) the return destination ID written to the register by the second write section and (ii) a return confirmation ID assigned as identification information uniquely to the second instruction group included in the second process to provide a determination result, the return confirmation ID being read from a specified storage area of the memory, identifies an error occurrence if the determination result indicates the mismatch, and permits the transition to the second instruction group included in the second process if the determination result indicates the match.

4. The electronic control unit according to claim 1, further comprising a permission section that permits the execution section to execute a first instruction included in the first process if a comparison result of the comparison section indicates a match between the address of the memory indicated by the program counter and the address of the memory stored in the expected value counter.

5. The electronic control unit according to claim 1, wherein:

the electronic control unit is mounted in an automobile and controls an onboard apparatus of the automobile;

the memory stores a plurality of settings used by the second process to control the onboard apparatus; and the first process rewrites at least one of the plurality of settings used by the second process to control the onboard apparatus.

6. The electronic control unit according to claim 1, wherein the electronic control unit is mounted in an automobile and controls an onboard apparatus of the automobile, the onboard apparatus including at least one of lighting apparatuses, power windows, and door locks of the automobile.

7. The electronic control unit according to claim 1, wherein the electronic control unit is mounted in an automobile and controls an onboard apparatus of the automobile, the onboard apparatus including at least one of an engine, a brake system, a power train mechanism, an automobile navigation system, and a meter of the automobile.

* * * * *